(12) United States Patent
Hartstone

(10) Patent No.: US 6,648,150 B2  
(45) Date of Patent: Nov. 18, 2003

(54) STORAGE DEVICE

(75) Inventor: Mark Gregory Hartstone, Mission Bay (NZ)

(73) Assignee: The CD Storage Company Limited, Auckland (NZ)

(*) Notice: Subject to any disclaimer, the term of this patent is extended or adjusted under 35 U.S.C. 154(b) by 0 days.

(21) Appl. No.: 09/918,480

(22) Filed: Aug. 1, 2001

(65) Prior Publication Data

US 2002/0027112 A1 Mar. 7, 2002

(30) Foreign Application Priority Data

Aug. 1, 2000 (NZ) .............................................. 506078  
Nov. 8, 2000 (NZ) .............................................. 508014

(51) Int. Cl.⁷ .................................................. A47F 7/00
(52) U.S. Cl. .............................. 211/40; 211/11; 211/43; 211/184
(58) Field of Search .......................... 211/184, 11, 50, 211/42, 43, 40

(56) References Cited

U.S. PATENT DOCUMENTS

| | | | | |
|---|---|---|---|---|
| 945,877 A | * | 1/1910 | Updegraff | |
| 2,504,466 A | * | 4/1950 | Stolzoff | 211/11 |
| 2,522,986 A | * | 9/1950 | Bruen | |
| 2,908,394 A | * | 10/1959 | Thoweman | 211/40 |
| 3,817,393 A | * | 6/1974 | Neilsen | 211/50 |
| D251,848 S | * | 5/1979 | Hollerith | |
| 4,535,896 A | * | 8/1985 | Evenson | 211/43 X |
| 4,641,897 A | * | 2/1987 | Long et al. | 211/50 X |
| 4,763,795 A | * | 8/1988 | Metzger et al. | 211/11 |
| 4,790,440 A | * | 12/1988 | Leszczak | 211/11 |
| 5,219,216 A | | 6/1993 | Hassel et al. | |
| 5,392,913 A | | 2/1995 | Merrick | |
| 5,762,208 A | * | 6/1998 | Yeh | 211/40 |
| 5,924,564 A | | 7/1999 | Lin | |
| 6,308,839 B1 | * | 10/2001 | Steinberg et al. | 211/40 |

* cited by examiner

*Primary Examiner*—Robert W. Gibson, Jr.  
(74) *Attorney, Agent, or Firm*—Young & Thompson

(57) ABSTRACT

A storage device comprising a base, the base including at least one elongated member, the elongated member or members being arranged to engage, in use, a holding device in the form of an element having a peripheral slot able to engage the elongated member or members.

20 Claims, 5 Drawing Sheets

STORAGE DEVICE

This invention relates to a storage device and has been devised particularly though not necessarily solely for storing items such as compact discs, DVD's, computer discs such as floppy discs and zip discs, and the like.

The storage of items such as compact discs, computer discs, DVD's, computer discs such as floppy discs and zip discs, or other relatively flat items (hereafter disc) is often difficult. The packages in which such discs are sold are often bulky and various schemes have been developed to carry such devices. One particularly successful approach is the use of a holder which is in the form of a substantially flat pocket into which the disc can be placed, the holder having a number, in particular two narrow mouthed slots so that the slots can be engaged with a pillar or posts in a wide variety of holding devices. There still remains the difficulty of storing discs, when it is attempted to store such items in, for example, a cabinet or drawer. The discs are often simply placed into the drawer or cabinet where they slide about or otherwise become disorganised and difficult to select when required.

It is an object of the present invention to provide a storage device which will obviate or minimise the foregoing disadvantages in a simple yet effective manner or which will at least provide the public with a useful choice.

Accordingly in a first aspect the invention consists in a storage device comprising a base and at least one handle extending from the base, the base including at least one elongated member, elongated member or members being arranged to engage, in use, a holding device in the form of a element having a peripheral slot able to engage the elongated member or members.

Preferably they are two elongated members.

Preferably two handles are provided, one at each end of the base, the handles being similar in area to the products.

Preferably the handles include attachment means to allow the handles to be mounted on rails within a filing cabinet drawer, standard drawer, or standard desk or cabinet drawer.

Preferably the attachment means comprises hooks.

Preferably the base comprises at least one second elongated member between the handles.

Preferably the storage device is sized to fit existing filing cabinets, standard drawers, or standard desk or cabinet drawers.

Preferably the handle is an elongated member.

Preferably the elongated members are expandable.

Accordingly in a second aspect, the invention consists in a storage device comprising a base and at least one handle extending from the base, the base including at least one elongated member, the elongated member being expandable, and the elongated member(s) being arranged to engage in use, a holding device in the form of an element having a peripheral slot to engage the elongated member or members.

Preferably there are two elongated members.

Preferably each elongated member is telescoping.

Preferably two handles are provided the handle(s) being substantially greater in area than the area of the element.

Preferably the handles have a hook portion at the upper end which is shaped to hook over the rails in a filing cabinet.

Preferably the handle(s) are substantially less in area than the area of the element, being an elongated member.

Preferably there is a stop means which comprises an elongated member attached to the handle(s).

Preferably there is a stop means which comprises an elongated member attached to the elongated members of the base.

Preferably the elongate members are expandable.

Preferred forms of the invention will now be described with reference to the accompanying drawings in which.

Figure 1:
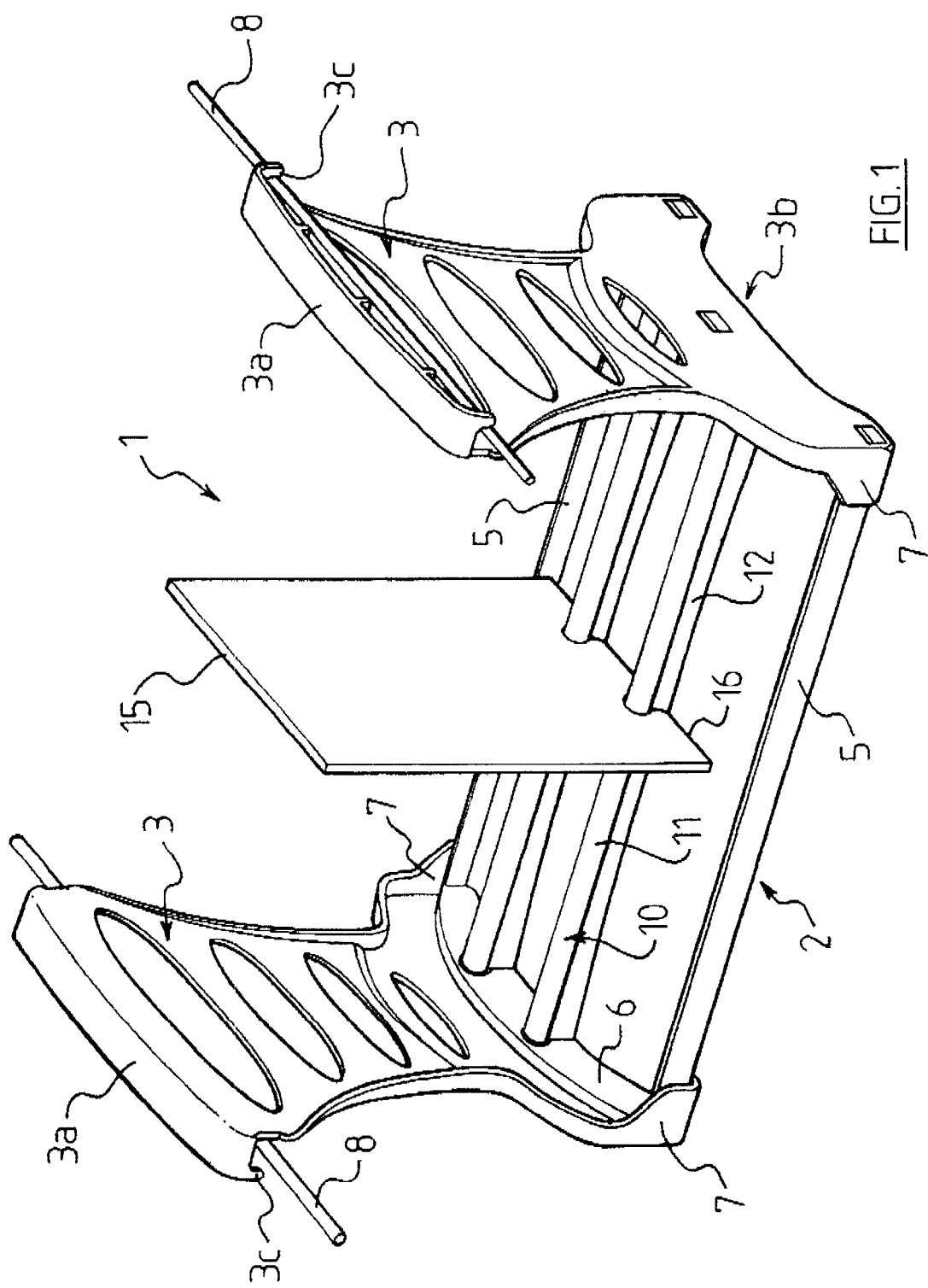
FIG. 1 is a perspective view of a storage device according to one preferred form of the invention.
Figure 2:
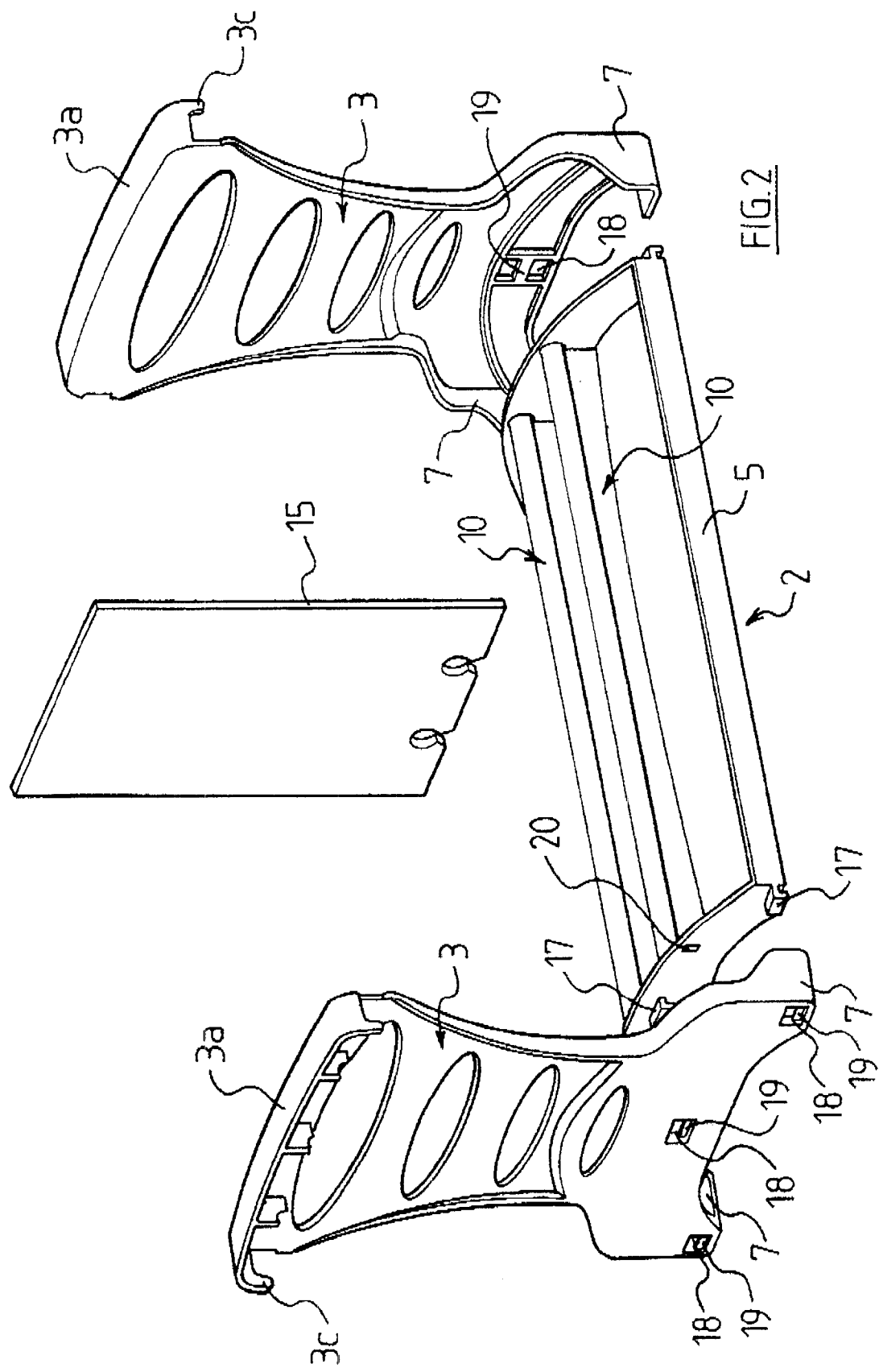
FIG. 2 is an exploded view of the construction of FIG. 1.
Figure 3:
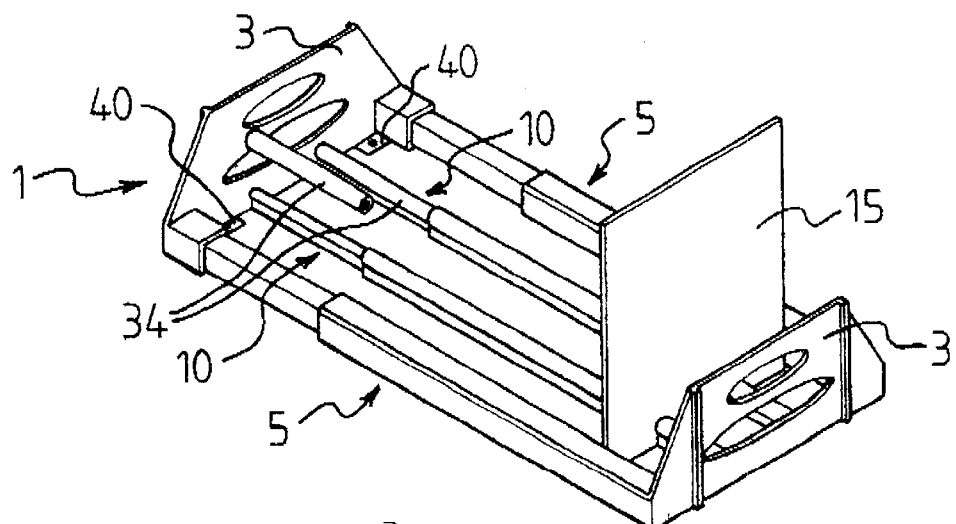
FIG. 3 is a perspective view of a storage device according to a second preferred form of the invention.
Figure 4:
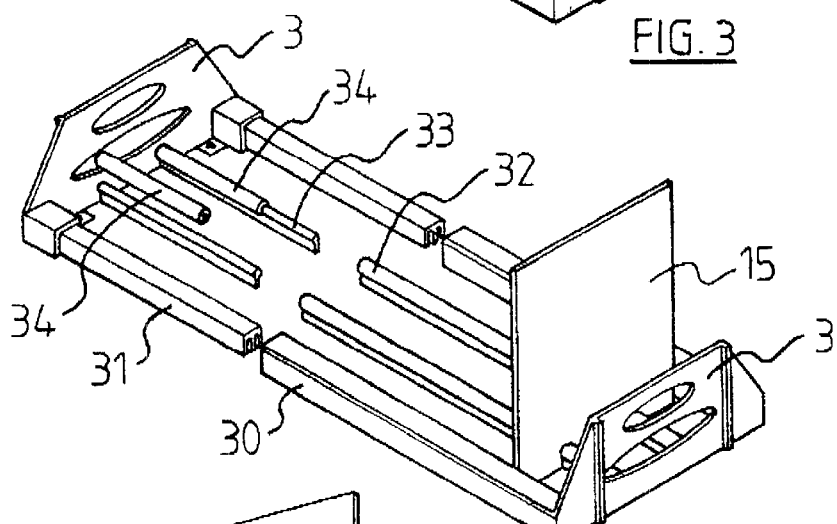
FIG. 4 is another perspective view of a storage device according to the second preferred form of the invention.
Figure 5:
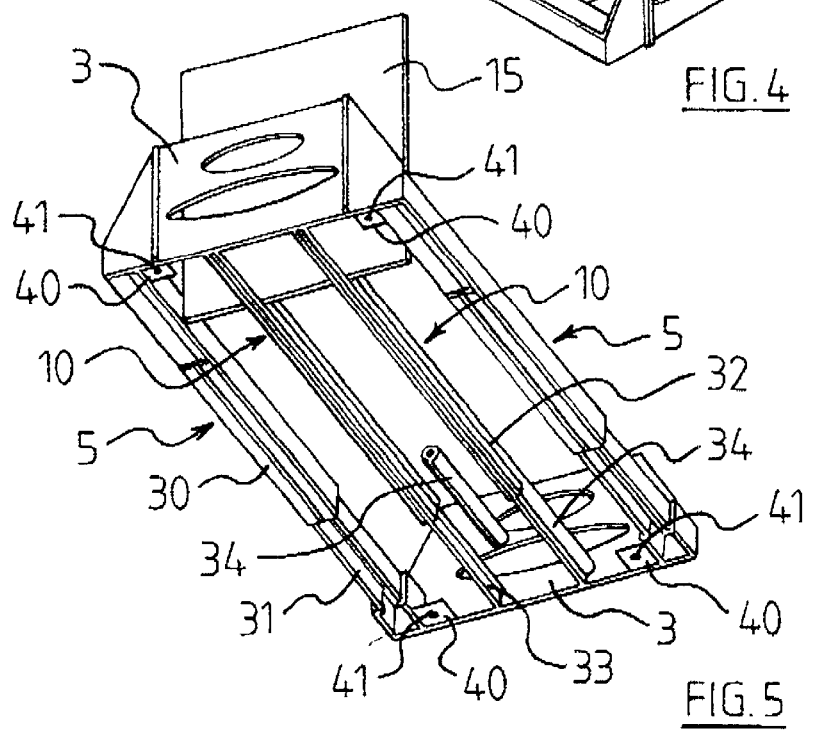
FIG. 5 is another perspective view taken from underneath of a storage device according to the second preferred form of the invention.

Referring to FIGS. 1 and 2 of the drawings in a first aspect a storage device 1 is provided which comprises a base indicated generally at 2, and one or more such as two handles 3. Handles 3 have a top portion 3a and a bottom portion 3b. The base and handles may be manufactured from plastics material having a suitable strength and the base may comprise a pair of stringers 5, which engage into the handles 3, for example, into a suitably receptive slot. In a preferred form, the stringers 5 are joined by end members 6 which can be a little arcuate and the end member 6 may be engaged into a recess formed by the main structure of the handle 3 and a pair of side flanges 7 at the bottom end, in use, of the handles 3. Top portion(s) 3a of the handles 3 include attachment means to engage rails in a filing cabinet drawer or other such devices. Suitable attachment means can be hooks. Each hook comprises a hook portion 3c which can either hook over any existing or new rails 8 in a filing cabinet. The rails 8 would generally be of the type used to support suspension folders in the filing cabinet. Connection between the handles 3 and the base 2 may be in any suitable manner. In this example "L" shaped lugs 17 are provided on the base 2 which snap into corresponding apertures 18 in the handles 3. The apertures 18 may have ribs 19 over which the "toe" of the "L" snaps to hold the base 2 and handle 3 in engagement. Pressure bumps 20 may be provided on, for example, the base 2 to increase the engagement.

Between the end member 6 are provided one or more, and preferably two, elongated members 10, which may take the form of a substantially circular part 11 with a bracing strut of smaller diameter 12 therebelow.

The construction is sized so as to fit an existing drawer such as in a filing cabinet, and in particular to engage rails 8.

The elongated members 10 are shaped so as to receive a holding device such as shown at 15 preferably for a disc or any other item that may fit into the holding device. The discs may be compact discs, DVD's, computer discs such as floppy discs and zip discs or any such items. The holding device 15 is shown diagrammatically, but may take the form, for example, of a pocket into which one or more discs may be placed. At one end, preferably the lower end 16, in use, a pair of slots are provided which have a narrow mouth on the edge 16. The material from which the pocket 15 is made has a degree of flexibility so that the pockets 15 may be "snapped" onto the elongated members 10.

The stringers 5 and elongated members 10 may be expandable, for example, by making those members telescopic.

Thus a substantial number of such pocket devices containing substantially fat devices, as above described, may be placed onto the holder as above described.

In reference to FIGS. 3–7 of the drawings in another aspect, a storage device 1 is provided which comprises a base 2 and one or more handles 3. The base and handles may be manufactured from plastics material having a suitable strength and the base comprises an expanding pair of stringers 5 and elongated members 10.

In a preferred embodiment that stringers 5 and elongated members 10 are integrally joined to the base of handles 3. Alternatively, the connection between the handles 3 and the stringers 5 or elongate member 10 may be in any suitable manner. In this example, the stringers 5 comprise an outer member 30 and an inner member 31 which telescopes within the outer member 30. The elongated members 10 comprise an outer member 32 and an inner member 33 which telescopes within the outer member 32.

A stop means 34 includes a first stop means and second stop means. The first stop means is attached to the handle 3 and second stop means is attached to the stringer. The first stop means is substantially parallel to the second stop means and is cantilevered from the handle 3, to thereby when in use, abut a holder or holders which in turn will abut the other handle 3 so that the holders are substantially upright. The second stop means comprises an elongate tunnel shaped member substantially parallel to the stringers, which mates with one of the telescoping elongate members, which elongate member fits within the associated other telescoping member. The second stop means when in use acts by abutting against the other telescoping member thereby reducing the length of the storage device to enable it to match the internal length of any drawer, cabinet or other such device. The storage device also has a fixing means which enables the device to be positively fixed to any surface. The fixing means comprises a planar member 10 with an aperture 41 for any suitable fastener to be inserted.

In use, the holder as described, can be inserted into or sized to fit into existing or new drawer(s), cabinet(s), filing cabinets, standard drawers, standard desk or cabinet drawers or other such device(s). The holders may be engaged and disengaged readily with the storage device, but whilst in use, maintains the holders and thereby the items therein, in an organised and accessible manner enabling a desired item to be readily found. This is advantageous.

Figure 6:
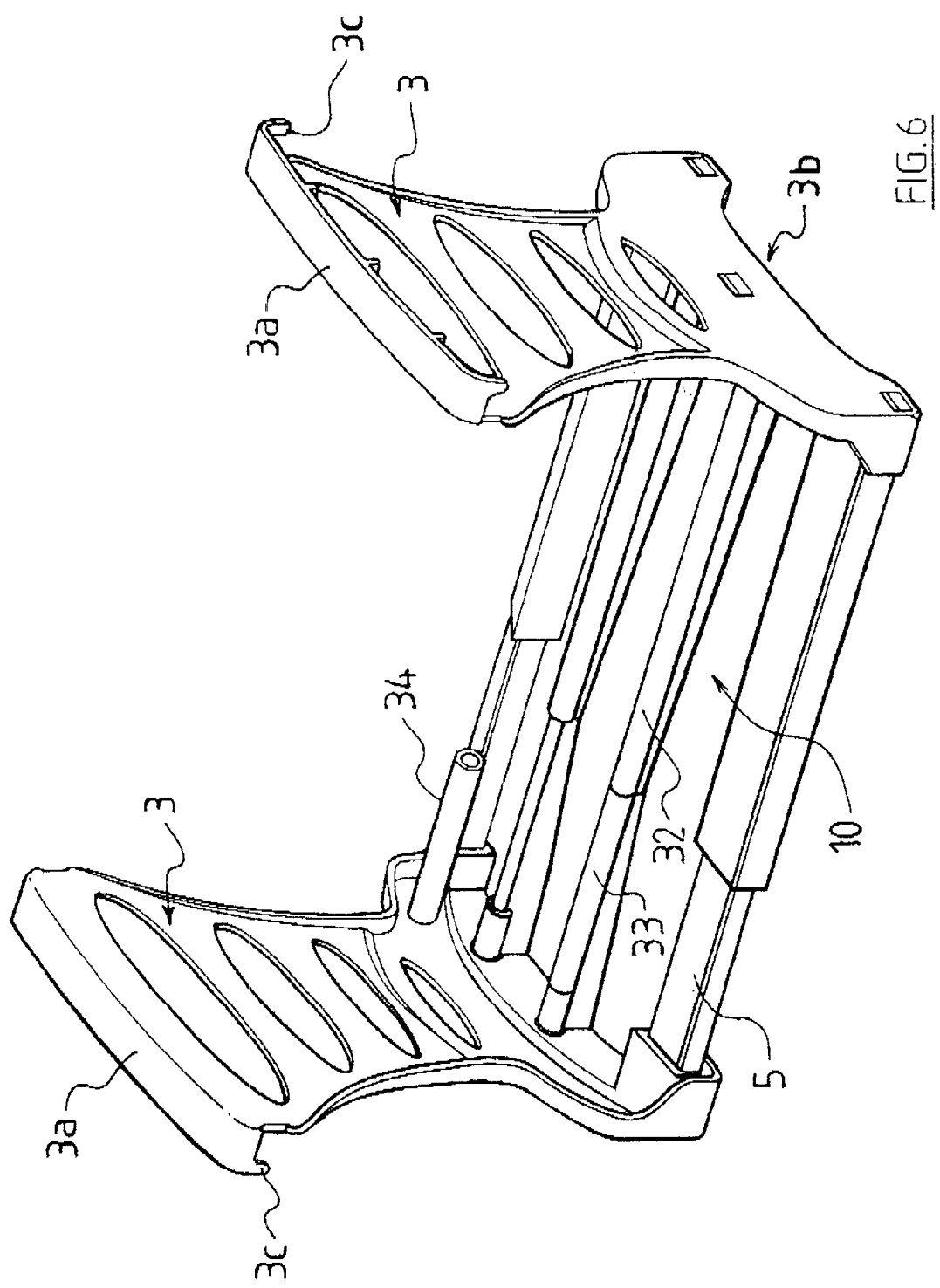
FIG. 6 is a perspective view of a storage device according to another aspect of the second preferred form of the invention.
Figure 7:
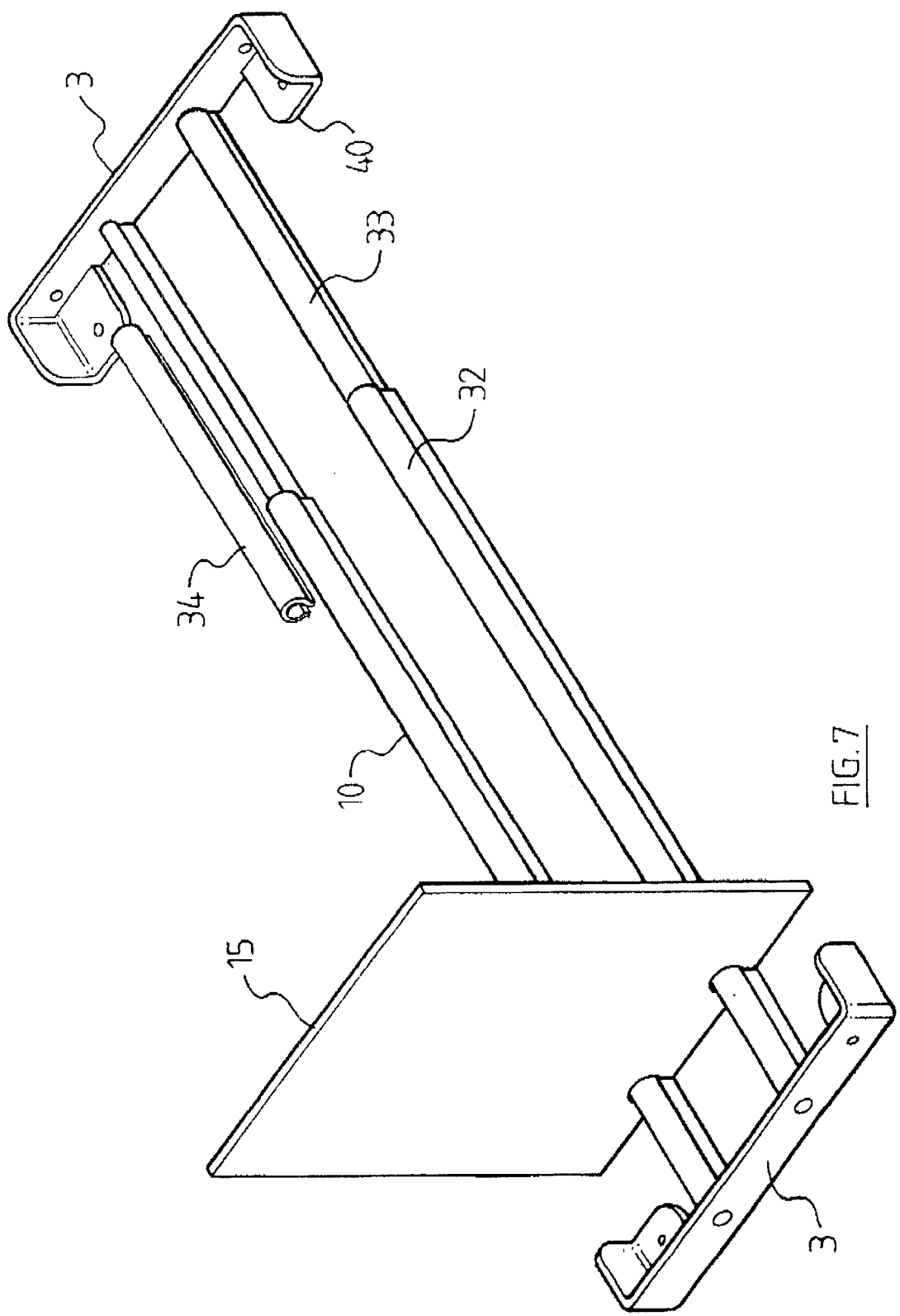
FIG. 7 is a perspective view of a storage device according to another aspect of the second preferred form of the invention.

As shown in FIGS. 6 and 7 other variations in the expanding form of the storage device are possible. Comparable features as already labelled and explained in previous FIGS. 1–5, are repeated in FIGS. 6 and 7. FIG. 6 in particular shows the same features as indicated in FIG. 1 but now with the expanding base and stop means 34. FIG. 7 introduces an elongate handle 3 with expanding base members 32 and 33 and stop means 34.

Any suitable adhesive means can be applied to planar member 40 in FIGS. 3–7 and also to a comparable member in FIGS. 1 and 2, in combination with other fixing means or not in combination therewith.

I claim:

1. A storage device comprising:
    a base;
    at least one elongated member included on the base;
    at least one holding device in the form of an element having at least one peripheral slot,
    the elongated member being arranged to engage, in use, the peripheral slot of the holding device;
    a pair of handles one at each end of the base; and
    attachment means included in the handles to allow the handles to be mounted on rails within one of a filing cabinet drawer, a standard drawer, and a standard desk drawer,
    wherein the storage device is sized to fit within one of the filing cabinet drawer, the standard drawer, and the desk drawer.

2. A storage device as claimed in claim 1, wherein there are two elongated members.

3. A storage device as claimed in claim 1, wherein the handles are similar in area to the holding device.

4. A storage device as claimed in claim 1, wherein,
    the elongated member comprises a first elongate element of a first width attached to the base and a second elongate element of a second width,
    the second elongate element is positioned on a the first elongate element to engage, in use, the holding device,
    the first and second widths being different.

5. A storage device as claimed in claim 1, wherein the attachment means comprises hooks.

6. A storage device as claimed in claim 1, wherein the handles are elongated members.

7. A storage device as claimed in claim 1, wherein a stop means comprising an elongate member is attached to the handle.

8. A storage device as claimed in claim 1, wherein,
    the elongated member included on the base is an expandable elongated member comprising an inner elongate member engaged into a second elongate member; and
    an elongate stop means is attached to the inner elongate member.

9. A storage device is claimed in claim 1, further comprising:
    a pair of expandable stringers,
    the elongated member of the base being substantially parallel to and positioned between the pair of stringers.

10. A storage device as claimed in claim 9, wherein the stringers extend between the handles.

11. A storage device as claimed in claim 1, wherein, the holding device has at least one pocket able to hold a substantially flat object.

12. A storage device, comprising:
    a base;
    at least one handle extending from the base;
    at least one elongated member included on the base,
    the elongated member being expandable;
    a holding device in the form of an element having at least one peripheral slot to engage the elongated member,
    the elongated member being arranged to engage, in use, the holding device; and
    a stop member comprising a second elongated member attachable to the expandable elongate member of the base.

13. A storage device as claimed in claim 12, wherein,
    there are two elongated members attached to the base,
    each elongate member having one stop means engageabled therewith.

14. A storage device as claimed in claim 12, wherein each elongated member comprises a telescopic member.

15. A storage device as claimed in claim 12, wherein at least two handles extend from the base.

16. A storage device as claimed in claim 15, wherein the handles are each substantially less in area than the area of the holding device.

17. A storage device as claimed in claim 15, wherein the handles are each substantially equal in area to the area of the holding device.

18. A storage device as claimed in claim 14, wherein the stop member comprises an elongate tunnel shaped member which mates with the telescoping member.

19. A storage device for storing items including flat disc media, comprising:
   a base;
   two handles having a top portion and a bottom portion of plastics material, and a pair of slots;
   a pair of stringers attached to the base and engaged into the slots;
   attachment elements located in the top portion of the handles to engage a pair of parallel hanging rails;
   at least one elongated member located intermediate the pair of stringers; and
   a holding device engaged with the elongated member and able to slide along the elongated member.

20. The storage device of claim 19, wherein,
   the holding device comprises a pocket for holding at least one of the flat disc media, and
   the holding device is removably by snapping engagement onto the elongaged member.

* * * * *